United States Patent [19] [11] Patent Number: 4,830,177
Baba et al. [45] Date of Patent: May 16, 1989

[54] BUCKET ELEVATOR-TYPE CONTINUOUS UNLOADER

[75] Inventors: Keitaro Baba, Saijo; Yoshitaka Yagi, Niihama, both of Japan

[73] Assignee: Sumitomo Heavy Industries, Ltd., Tokyo, Japan

[21] Appl. No.: 179,335

[22] Filed: Apr. 8, 1988

[30] Foreign Application Priority Data

Apr. 24, 1987 [JP] Japan .................................. 62-99945
Apr. 24, 1987 [JP] Japan .................................. 62-99946

[51] Int. Cl.⁴ ............................................. B65G 17/36
[52] U.S. Cl. .................................... 198/509; 198/519; 198/709; 198/710; 198/712
[58] Field of Search ............... 198/509, 511, 519, 507, 198/709, 710, 712, 813, 814, 816, 845, 838; 414/139, 917, 133

[56] References Cited

U.S. PATENT DOCUMENTS 4,128,952 12/1978 Duke et al. ..................... 198/813 X

FOREIGN PATENT DOCUMENTS

| 54-36465 | 11/1979 | Japan . | |
| 0069635 | 4/1983 | Japan | 414/139 |
| 0078926 | 5/1983 | Japan | 414/139 |
| 0064406 | 4/1984 | Japan | 198/509 |
| 0078012 | 5/1984 | Japan | 414/139 |
| 59-212325 | 12/1985 | Japan . | |
| 0027837 | 2/1986 | Japan | 414/139 |

Primary Examiner—Frank E. Werner
Assistant Examiner—D. Glenn Dayoan
Attorney, Agent, or Firm—Armstrong, Nikaido, Marmelstein, Kubovcik & Murray

[57] ABSTRACT

A bucket elevator-type continuous unloader in which guide rails are provided on a frame of a horizontal scraping section and rollers engaging with each guide rail are provided for a train of elevator buckets, wherein the guide rails are adapted to be engaged with or disengaged from the rollers of the train of elevator buckets, whereby both a lateral scraping system, in an engaged state and a catenary scraping system in a disengaged state can be selectively adopted.

6 Claims, 7 Drawing Sheets

BUCKET ELEVATOR-TYPE CONTINUOUS UNLOADER

BACKGROUND OF THE INVENTION

1. Field of the Invention

The present invention relates to a bucket elevator-type continuous unloader.

2. Description of the Prior Art

A crane which is used at a wharf to unload coal, mineral ores, and other types of bulk cargo with a high efficiency is generally called an unloader. Such an unloader grabs and discharges the bulk cargo in the hold by means of a grab bucket. However, in order to further enhance the efficiency, a bucket elevator has come to be used in place of the grab bucket.

Such a bucket elevator-type continuous unloader has had problems in that, at the time of unloading the bulk cargo stowed in a ship's bottom, i.e., clearing goods from the bottom, there is a risk of damaging the bottom or the bucket as a result of a collision between the vertically moving bottom and a scraping section of the bucket elevator, and in that an uncleared portion remains in the bottom cleaning operation.

For this reason, a proposal has been made to transmit an electrical signal as the lower end of the bucket elevator reaches a certain distance from the ship's bottom (see Japanese Utility Model Examined Publication No. 54-36465). Another proposal has been made to allow the bucket elevator to escape in correspondence with variations in load by incorporating a load cell, a limit switch, etc. in an elevator post of the bucket elevator (see the description of the prior art in Japanese Patent Unexamined Publication No. 59-212325). In either of these proposals, however, there are cases where the timing of preventing the collision between the bucket and the bottom is delayed, so that it has not yet been possible to prevent the above-described accidents.

Furthermore, among bucket elevator-type continuous unloaders of this type, there is known one which makes it possible to selectively adopt two different scraping systems: a usual one (a lateral scraping system) in which the bulk cargo is scraped while the overall bucket elevator is being moved toward the side of each bucket, and another one (a catenary scraping system) which, when cleaning the bulk cargo from the bottom, makes it possible to absorb an impact caused by the vertical movement of the hull by setting the chains in a catenary (loose) state and to clean up the bulk cargo in the bottom (for instance, see Japanese Patent Unexamined Publication No. 59-212325). However, such a known unloader is arranged such that the bucket chains in a scraping section is set in a catenary state by adopting a system whereby lower sprockets of the bucket elevator are merely lifted by a cylinder.

However, (1) in recent years, holds of bulk cargo vessels have tended to become large in capacity as a result of the tendency of vessels to become large. Consequently, the length of a horizontal scraping portion in the unloader has also become large. (2). Therefore, all the horizontal forces for scraping (not only the force for tracting the bucket but also those acting vertically and horizontally) act on the chain. Hence, a need to strengthen the chain has arisen. (3). This has resulted in a heavier weight of the unloader. Consequently, in order to prevent the vertical or horizontal forces from being applied to the chain, it is necessary to install a guide rail in the horizontal scraping section and to provide each bucket with rollers guided by this guide rail.

Namely, a known unloader has the above-described drawbacks and needs, and if a guide rail and rollers are to be installed to satisfy these needs, there is a disadvantage in that catenary scraping cannot be effected.

SUMMARY OF THE INVENTION

Accordingly, an object of the present invention is to provide a bucket elevator-type continuous unloader which makes it possible to selectively adopt a lateral scraping system and a catenary scraping system, thereby overcoming the above-described drawbacks of the prior art.

To this end, according to the present invention, there is provided a bucket elevator-type continuous unloader having a vertically held elevator post, a horizontal frame provided horizontally below the elevator post and rotatably supporting sprockets at opposite ends thereof, respectively, a pair of endless chains trained between the sprockets and adapted to travel circularly such as to be lifted along one side of the elevator post and to be lowered along the other side thereof, a train of elevator buckets installed on the pair of chains at both ends thereof, and means for moving the horizontal frame vertically relative to the elevator post, the unloader comprising: pairs of rollers secured to respective ends of the elevator buckets and each adapted to rotate around an axis perpendicular to a traveling direction of the chains; a pair of guide rails supported by the horizontal frame and each having a groove for engagement with the rollers on an outside surface thereof; means for operating the guide rails in such a manner as to disengage the rollers from the guide rail grooves; and means for aligning the train of rollers at a position at which the train of rollers are engageable with the guide rail grooves before the train of rollers are engaged with the guide rail grooves.

The other objects, features and advantages of the present invention will become apparent from the following detailed description of the preferred embodiments when read in conjunction with the accompanying drawings.

Figure 2:
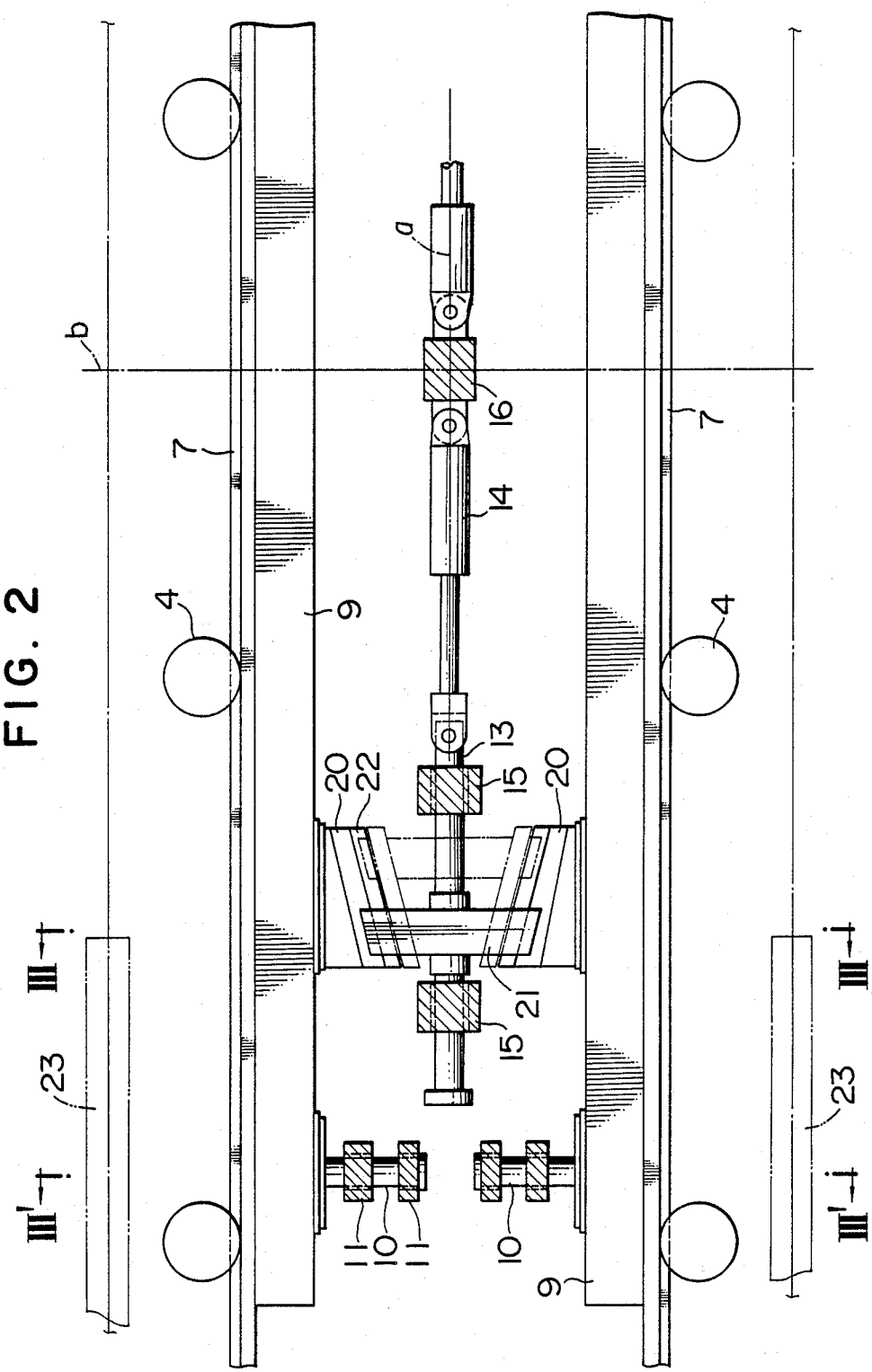
FIG. 2 is a top plan view illustrating essential portions of a first embodiment of the present invention.
Figure 3:
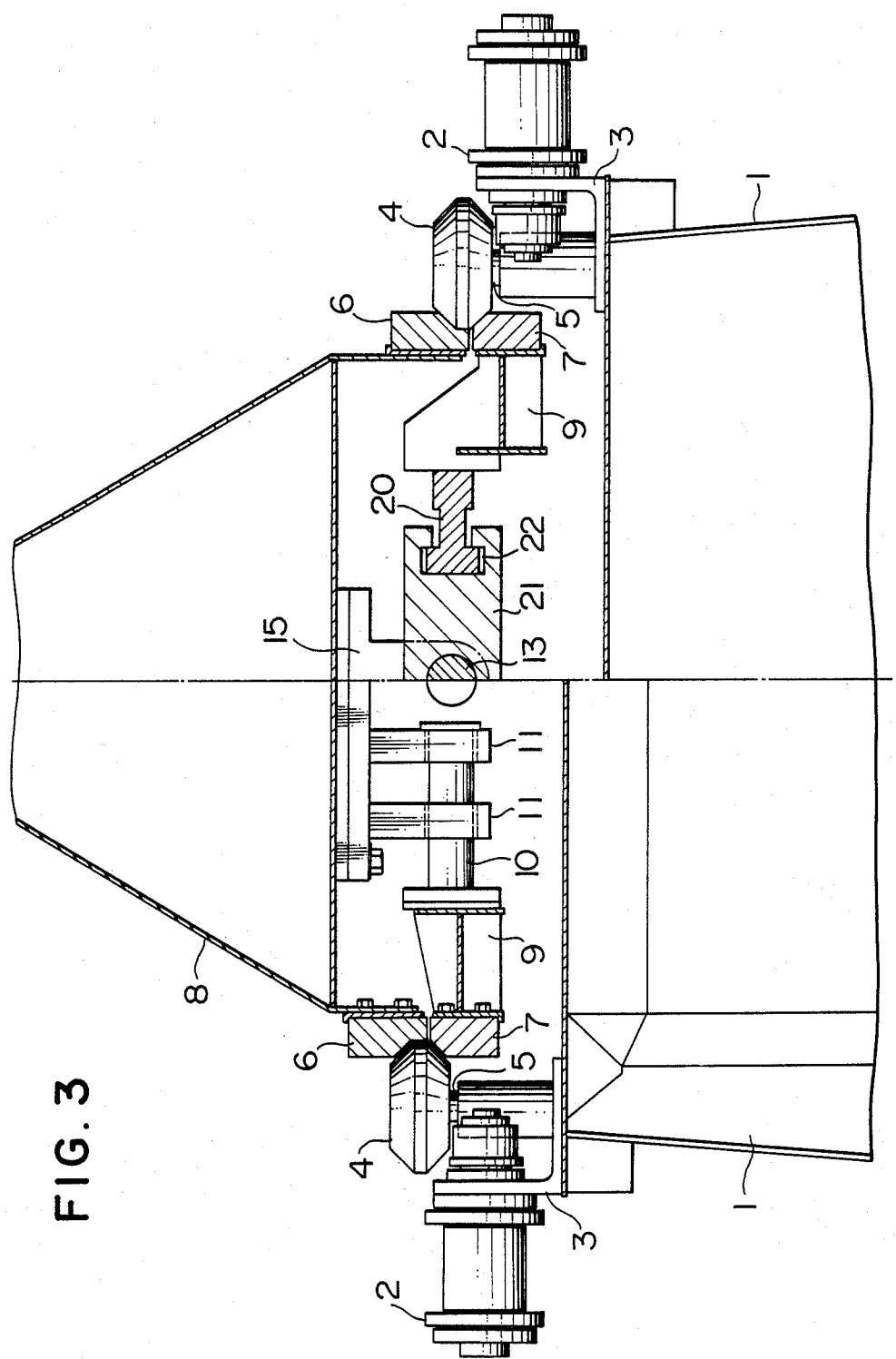
Figure 4:
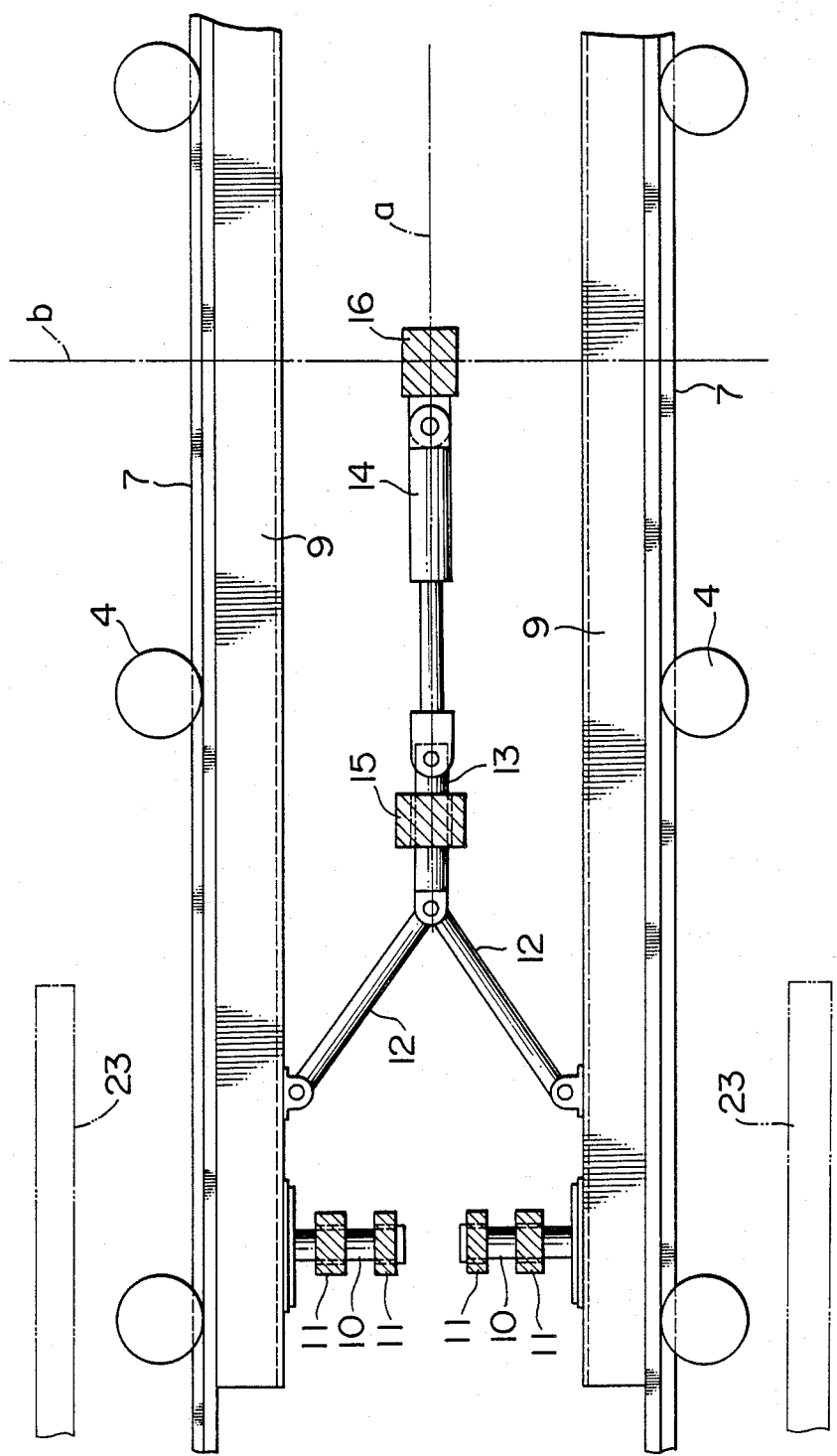
Figure 5:
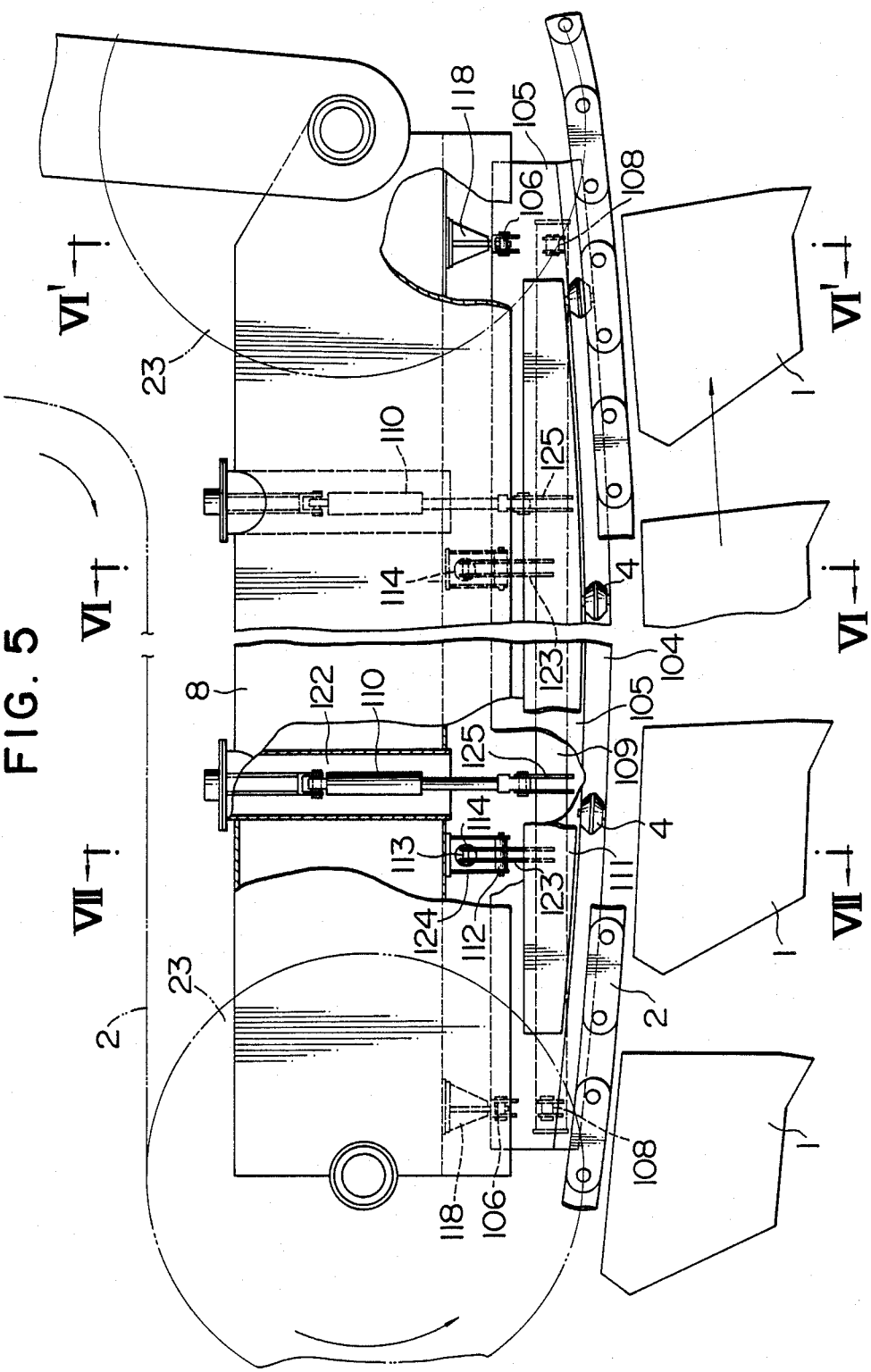
Figure 6:
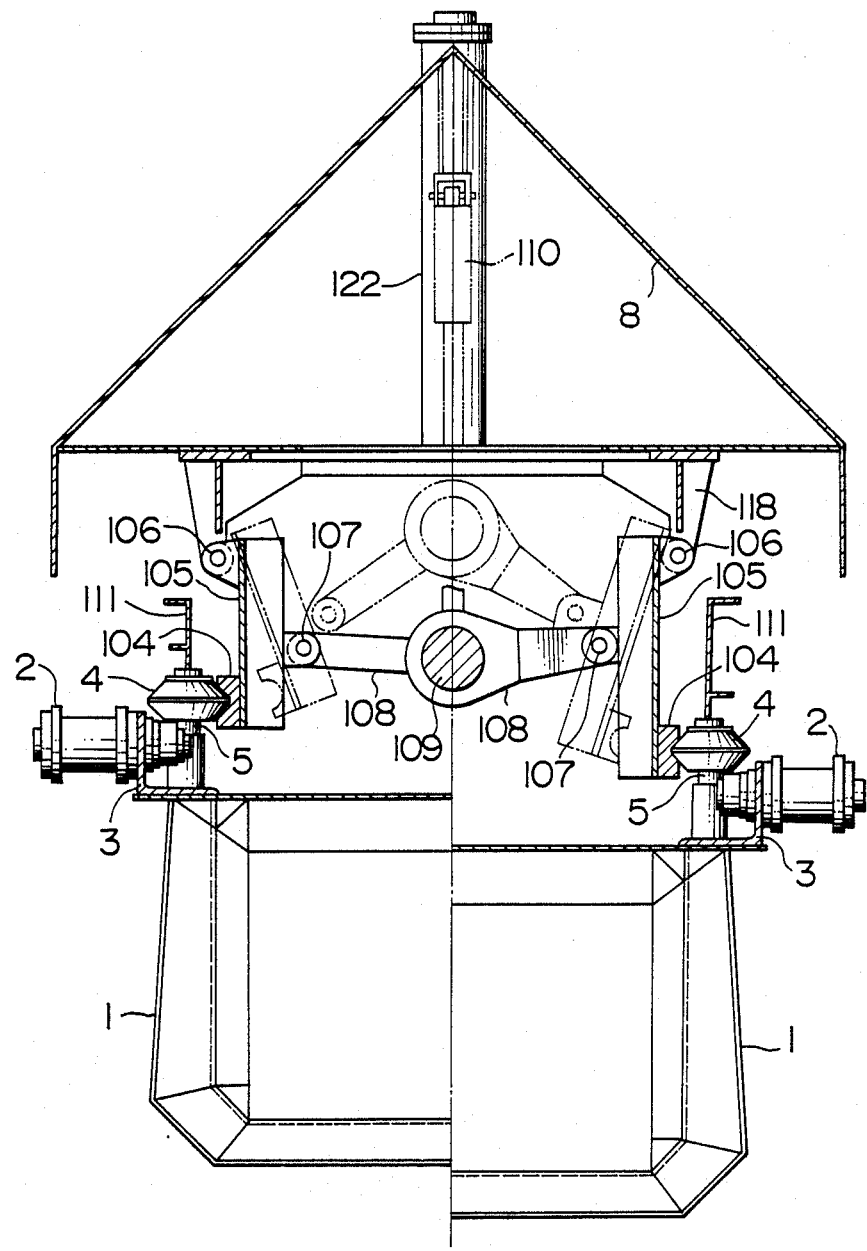
Figure 7:
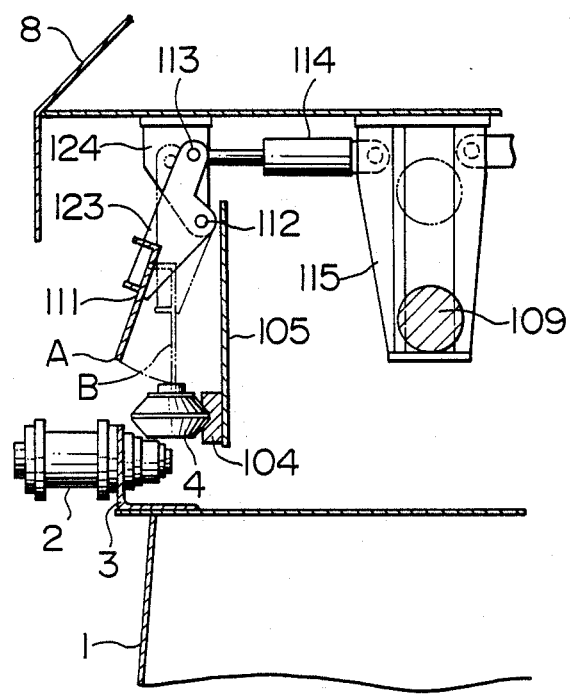

The right-hand side of FIG. 3 is a cross-sectional view taken along the line III—III of FIG. 2;

The left-hand side of FIG. 3 is a cross-sectional view taken along the line III'—III' of FIG. 2;

FIG. 4 is a top plan view of essential portions of a modification of the first embodiment;

FIG. 5 is a partially cut-away side-elevational view of essential portions of a second embodiment of the present invention;

The right-hand side of FIG. 6 is a cross-sectional view taken along the line VI—VI of FIG. 5;

The left-hand side of FIG. 6 is a cross-sectional view taken along the line VI'—VI' of FIG. 5; and FIG. 7 is a cross-sectional view of essential portions taken along the line VII—VII of FIG. 5.

DESCRIPTION OF THE PREFERRED EMBODIMENTS

Figure 1:
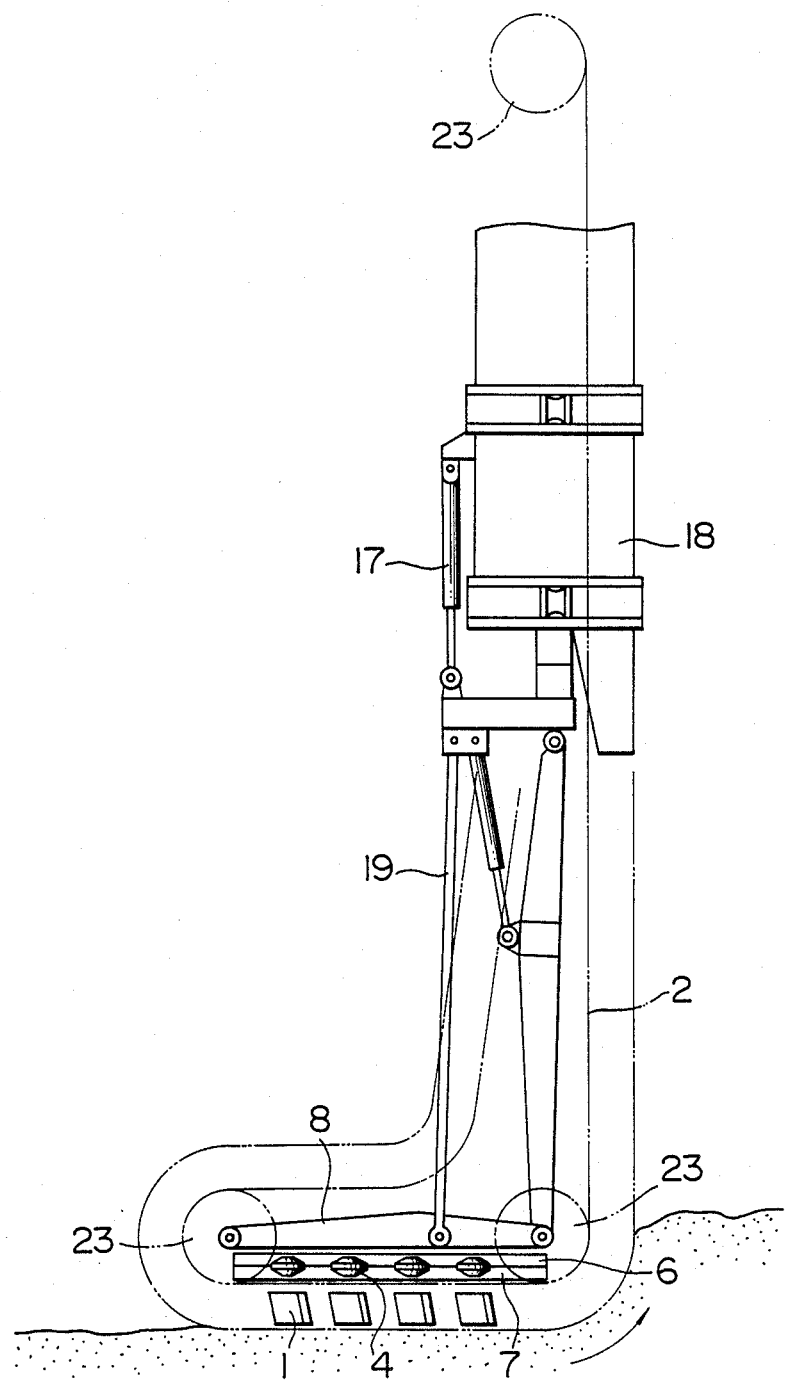
FIG. 1 is a schematic diagram of a bucket elevator-type continuous unloader to which the present invention is applied.

FIG. 1 is a schematic diagram of a bucket elevator-type continuous unloader to which the present invention is applied so that a lateral scraping system and a catenary scraping system that are suitable for a large hold can be selectively employed. FIGS. 2 and 3 illustrate essential portions of a first embodiment. In FIG. 2, since the drawing is symmetrical with respect to the line a between the upper and lower halves and symmetrical with respect to the line b between the right and left halves, a description will be given of the upper left portion alone.

In FIGS. 2 and 3, reference numeral 1 denotes a bucket; 2, a chain mounted on each end of the bucket 1 via a chain bracket 3; 4, a roller having the external shape of a bead on an abacus, each roller 4 being rotatably mounted on a roller shaft 5 erected on each chain bracket 3. Numeral 6 denotes an upper guide rail, while numeral 7 denotes a lower guide rail. The upper guide rail 6 is secured on the outside of a frame 8 of a horizontal scraping section, while the lower guide rail 7 is supported by a slidable rod 10 via an intermediate member 9. The slidable rod 10 is slidably inserted into brackets 11 suspended from the frame 8 of the horizontal scraping section. In addition, in order to have both lower guide rails move in parallel, each lower guide rail 7 is provided with a protrusion 20 having a T-shaped section via the intermediate member 9 such as to be disposed slightly closer to the central portion. The T-shaped protrusion is fitted into a T-groove 22 provided in a wedge 21. The wedge 21 is connected to a drive cylinder 14 via a sliding rod 13. The sliding rod 13 is slidably inserted into a sliding rod bracket 15 suspended from the frame 8 of the horizontal scraping section. A base portion of the drive cylinder 14 is pivotally supported by a cylinder bracket 16 suspended from the frame 8 of the horizontal scraping section. Although not completely illustrated, in FIG. 2, a base portion of a right-hand drive cylinder is also pivotally supported by the cylinder bracket 16. In FIG. 1 reference numeral 17 denotes a telescopic cylinder; 18, an elevator post; 19, a link; and 23, a sprocket of the chain 2.

Since the above-described arrangement is adopted, this embodiment operates as described below.

Namely, when the apparatus is used in the usual lateral scraping system, each bucket 1 in the horizontal scraping section moves rightwardly as viewed in FIG. 1 to effect scraping while the bucket elevator moves perpendicularly to the plane of FIG. 1 in a state in which the rollers 4 are guided by the upper and lower guide rails 6, 7 and restricted by the frame 8 of the horizontal scraping section. When scraping, all of the forces applied to the buckets 1, excluding the tractive force along the direction of travel of the chains, are carried by the frame 8 of the horizontal scraping section via the rollers 4.

When a change is made from the lateral scraping system to the catenary scraping system, the bucket elevator is stopped, and the frame 8 of the horizontal scraping section is pushed downwardly by the expanding action of the telescopic cylinder 17 via the link 19. As a result, the excessive tension is applied to the chain 2, so that the rollers 4 are pressed against the guide rail 6. Subsequently, when the wedge 21 is pulled by the shrinking action of the drive cylinder 14, the T-shaped protrusions 20 respectively fitted into the T-shaped grooves 20 move in such a manner as to approach the line a in the drawing. As a result, both lower guide rails 7 also move in such a manner as to approach the line a. If the chain 2 is then loosened by the shrinking action of the telescopic cylinder 17, the rollers 4 are set in a free state, so that the chain portion below the frame 8 of the horizontal scraping section assumes a catenary state.

When a change is made from the catenary scraping system to the lateral scraping system, in the same manner as described above, the bucket elevator is stopped, and the frame 8 of the horizontal scraping section is pushed downwardly by the telescopic cylinder 17 via the link 19. As a result, excessive tension is applied to the chain 2, and the rollers 4 are pressed against the upper guide rails 6. If the wedge 21 is then pressed by the expanding action of the drive cylinder 14, the T-shaped protrusions 20 move in the direction of separating from the line a in the drawing. Consequently, the lower guide rails 7 return to the travelling lines of the rollers 4. The pressure of the telescopic cylinder 17 is then returned to the normal pressure used for the lateral scraping system.

Alternatively, in order to have both lower guide rails 7 move in parallel, it is possible to employ a mechanism shown in FIG. 4, which illustrates a modification of the first embodiment. In other words, the arrangement is such that one end of a pair of links 12 is pivotally supported at a position slightly closer to the central portion of each of the lower guide rails 7 via the intermediate member 9, while the other end of each of the links 12 is connected to the drive cylinder 14 via the sliding rod 13.

In addition, an external thread (not shown) may be provided on the sliding rod 13 showing FIG. 4, and an internal thread engaging with the external thread may be rotated to cause the lower guide rails to approach or separate from each other.

The above-described embodiment produces the following effects:

Since the two guide rails, which guide the rollers mounted on both sides of the buckets and oppose each other on rear read sides thereof, are divided into a pair of upper guide rails and a pair of lower guide rails, and since the lower guide rails are adapted to approach or separate from each other so as to engage with or disengage from the rollers, it is possible to speedily effect a change from the lateral scraping system to the catenary scraping system, or vice versa. Consequently, the scraping portion can be elongated, which, in turn, contributes to a high efficiency in the scraping operation. Particularly in the lateral scraping system, since the rollers are guided by the upper and lower guide rails, downward and lateral loads acting on the buckets during scraping are carried by these guide rails, so that no undue force is imparted to the chains. In addition, since only the lower guide rails are engaged with or disengaged from the rollers, the strength of the moving mechanism thereof can be alleviated, and a versatile mechanism can be provided.

Referring now t FIGS. 5, 6 and 7, a description will be given of a second embodiment of the present invention. In the drawings, reference numeral 1 denotes the bucket; 2, the chain mounted via the chain bracket 3; and 4, the roller having the appearance of a bead on an abacus and installed rotatably on the roller shaft 5 erected on the chain bracket 3. Numeral 104 denotes a guide rail which has a substantially V-shaped guide surface on an outer side thereof and whose longitudinally central portion has a configuration of an upwardly projecting arc. This guide rail 104 is disposed on an outer surface of a guide rail supporting plate 105 such as to lie parallel therewith and is adapted to guide the rollers 4. The guide rail supporting plate 105 is suspended from a guide rail bracket 118 of the frame 8 of the horizontal scraping section via pins 106 such as to be inwardly swingable. One end of a link 108 is pivotally supported by a pin 107 on the inner surface of the guide rail supporting plate 105, while the other end of the link 108 is rotatably fitted around an elongated horizontal shaft 109. The horizontal shaft 109 is suspended from vertically driving cylinders 110 (two in the illustrated case) via holders 125, while each of the driving cylinders 110 is disposed vertically in each cylindrical hollow portion 122 of the frame 8 of the horizontal scraping section. The horizontal shaft 109 is adapted to move vertically while being guided by guides 115 suspended from the frame 8 of the horizontal scraping section (see FIG. 7). A positioning cylinder 114 is provided on both sides of each of the guides 115 and is adapted to swing a positioning bracket 123 about a pin 112 by the reciprocating motion resulting from the large arcuate motion of a pin 113 pivotally secured to the tip of the positioning cylinder 114. The positioning bracket 123 is suspended from the frame 8 of the horizontal scraping section via a pin bracket 124 and is provided with a downwardly projecting positioning plate 111 for positioning the upper end of the roller shaft 5 of the roller 4. Incidentally, the lower edge of the positioning plate 111 has the shape of a longitudinally circular arc with its central portion located below.

In this embodiment, since the above-described arrangement is adopted, the apparatus operates as described below.

When a change is made from the lateral scraping system to the catenary scraping system, the operation is effected as follows: The bucket elevator is stopped, and the horizontal shaft 109 is lifted by the driving cylinders 110 via the holders 125, which, in turn, causes the horizontal links 108 to be lifted upwardly. Consequently, each of the guide rail supporting plates 105 connected to the link 108 swings about the pin 106, as indicated by the two-dot chain line shown in FIG. 6. Hence, the guide rail supporting plates 105 retreat inwardly together with the guide rails 104, and the rollers 4 are set in a vertically free state. Subsequently, the frame 8 of the horizontal scraping section is lifted upwardly by the telescopic cylinder 17, shown in FIG. 1, via the link 19, with the result that a slack portion is created in the chain 2 below the frame 8 of the horizontal scraping section, thus enabling catenary scraping.

When a change is made from the catenary scraping system to the lateral scraping system, the operation is effected as follows: In the same way as described above, the bucket elevator is stopped, and the positioning plates 111 are moved from A to B by the positioning cylinders 114, as shown in FIG. 7. Subsequently, the chain 2 is stretched as the frame 8 of the horizontal scraping section is lowered by the telescopic cylinder 17 via the link 19. If the horizontal shaft 109 is then lowered by the driving cylinders 110 via the holders 125, the guide rail supporting plates 105 swing outwardly each about the pin 106 by means of the links 108, which, in turn, causes the guide rails 104 to engage with the rollers 4 of the bucket 1 located below the frame 8 of the horizontal scraping section, and guide the rollers 4 in this state. Consequently, the forces to which the bucket 1 is subjected during lateral scraping are supported by the rollers 4, the guide rails 104, and the frame 8 of the horizontal scraping section in that order and are not applied to the chain 2.

What is claimed is:

1. A bucket elevator-type continuous unloader comprising a vertically held elevator post having a lower end, a horizontal frame extending horizontally from said lower end of said elevator post and having opposite ends, sprockets rotatably supported at said opposite ends of said frame, a pair of endless chains trained between said sprockets and arranged to travel circularly such as to be lifted along one side of said elevator post and to be lowered along the other side thereof, a train of elevator buckets installed on and extending between said pair of chains means for moving said horizontal frame vertically relative to said elevator post, 1
    pairs of rollers secured to said elevator buckets, one of each pair of rollers being adjacent one of said pair of chains, each roller being rotatable around an axes perpendicular to a traveling direction of said chains;
    a pair of guide rails supported by said horizontal frame and each having a groove for engagement with said rollers on an outside surface thereof;
    means for moving said pair of guide rails between a first position where said rollers are disengaged from said guide rail groovers and a second position where said rollers are engaged with said guide rail grooves, whereby in said first position, said pair of endless chains in an area below said frame assume a catenary state; and
    means for aligning said rollers at a position to be engaged with said guide rail grooves when said pair of guide rails are moved from said first position to said second position.

2. An unloader according to claim 1, wherein each of said guide rails has a longitudinal axis aligned with said groove and is divided into an upper guide rail and a lower guide rail at said longitudinal axis; said guide rail moving means including means for supporting said lower guide rail such as to be transversely movable relative to said horizontal frame and means for transversely moving said lower guide rail; and said means for aligning said rollers is constituted by said upper guide rail.

3. An unloader according to claim 2, wherein said means for transversely moving said lower guide rail includes a protrusion provided on a side of each of said lower guide rails opposite said rollers and having a T-shaped cross section, and a wedge-shaped member disposed between said lower guide rails longitudinally movably mounted on said frame, said wedge-shaped member having on both sides thereof a groove with a T-shaped cross section into which said protrusion fits.

4. An unloader according to claim 2, wherein said means for transversely moving said lower guide roller includes a sliding rod supported between said lower guide rails longitudinally slideably mounted on said frame, and a pair of levers, each lever having one end pivotally secured to one of said lower guide rails and an opposite end pivotally secured to said sliding rod.

5. An unloader according to claim 1, wherein said means for moving said pair of guide rails includes a pair of guide rail supporting plates, each plate having a lower edge and an upper edge, each upper edge being pivotally secured to said horizontal frame, each lower edge having one of said pair of guide rails secured thereto, and means for swinging said pair of guide rail supporting plates; and said means for aligning said rollers includes a pair of positioning plates swingably mounted on said frame, each positioning plate having a lower edge of a shape engageable with an apex of each of said rollers while said pair of guide rails are being moved from said first position to said second position, and means for swinging said positioning plates.

6. An unloader according to any of claims 1, 2, 3, 4 and 5, wherein said roller has the shape of a bead on an abacus, and each said guide rail groove has a V-shaped cross section.

* * * * *